United States Patent
Cicognani

[11] 3,934,968
[45] Jan. 27, 1976

[54] MOLD FOR MAKING DOUBLE-TOOTHED BELTS

[75] Inventor: Mario Cicognani, Milan, Italy

[73] Assignee: Industrie Pirelli S.p.A., Milan, Italy

[22] Filed: Mar. 4, 1975

[21] Appl. No.: 555,254

[30] Foreign Application Priority Data
Apr. 26, 1974 Italy .................................. 21925/74

[52] U.S. Cl. .................. 425/28 B; 425/40; 249/83; 425/129 R
[51] Int. Cl.² ...................... B29D 29/00; B29H 7/22
[58] Field of Search ............ 425/28 B, 29, 30, 34 B, 425/35, 39, 40, 43, 129 R; 249/83

[56] References Cited
UNITED STATES PATENTS

| | | | |
|---|---|---|---|
| 3,114,598 | 12/1963 | Beckadolph et al. | 249/83 X |
| 3,656,360 | 4/1972 | Fix | 425/28 B X |
| 3,784,338 | 1/1974 | Previati | 425/28 B |
| 3,813,197 | 5/1974 | Ray et al. | 249/83 X |

FOREIGN PATENTS OR APPLICATIONS

| | | | |
|---|---|---|---|
| 6,615,598 | 9/1967 | Netherlands | 425/28 B |

Primary Examiner—J. Howard Flint, Jr.
Attorney, Agent, or Firm—Stevens, Davis, Miller & Mosher

[57] ABSTRACT

A mold for shaping a belt having teeth on opposite sides thereof has a hollow cylindrical mandrel with a surface configuration corresponding to alternate grooves and teeth to be formed on one side of the belt and a plurality of bars arranged side by side around the mandrel having surfaces facing the mandrel corresponding to the configuration of teeth and grooves to be formed on the opposite side of the belt. The bars are supported in radially spaced relation with the mandrel surface in slots in the peripheral surface of end members for the cylinder and are adapted to move under pressure radially inwardly.

4 Claims, 4 Drawing Figures

MOLD FOR MAKING DOUBLE-TOOTHED BELTS

The present invention relates to a mold for the manufacture of toothed belts of elastomeric material provided with a double toothing, and more particularly to a mold which, by starting from the elements constituting a belt doubled together, is able to mold and to cure a driving belt provided with teeth on both of its faces.

Molds and devices for manufacturing belts of elastomeric material provided with teeth on both faces are already known.

One of the known molds is substantially formed by two parts: a mandrel provided with teeth on its outer surface and a deformable cylindrical jacket provided with teeth on its inner surface, which can be inserted on the mandrel.

The elements forming the belt, doubled together and forming a sleeve, are positioned between the two parts of the mold.

By exerting a pressure on the jacket, directed towards the mandrel, and by applying heat, the sleeve is molded and cured to shape it as a belt toothed on both faces.

This known type of mold has the disadvantage that the outer toothing of the double-toothed belt is defective for two reasons. The first reason is that the toothing provided on the deformable jacket is always inaccurate, since it is obtained in a deformable material; therefore the outer toothing of the double-toothed belt which follows the shape of the toothing of the deformable jacket, is also inaccurate. The second reason is that the jacket, made of deformable material, gets deformed during molding and this gives rise to an alteration of the toothing present on it, which consequently appears also on the outer toothing of the belt.

It is not possible to manufacture double-toothed belts provided with a covering fabric on the surface of the teeth and in the grooves of the outer toothing.

In fact, to be able to mold appropriately the outer toothing of the belt covered with a fabric, very high molding pressures must be adopted. This high pressure causes undesirable deformations in the jacket so such a process is impractical for molding a belt having teeth on both sides.

The deformable jacket provided internally with teeth obviously has a layout greater than that required by the outer toothing of the double-toothed belt, in order to be inserted on the sleeve. During the molding of the sleeve, the jacket, being deformable, reduces in its layout under the action of pressure. This reduction of layout does not take place in a uniform manner and this involves an alteration of the pitch of the belt toothing and of the size of the individual teeth.

After a relatively small number of working hours the deformable jacket must be replaced, since it is worn out, and this involves a very high manufacturing cost of the double-toothed belts.

Devices having two separate molds, namely one mold for the formation of the inner toothing of the belt and one for the formation of its outer toothing are already known for the manufacture of double-toothed belts of elastomeric material.

The mold for the formation of the inner toothing of the belt is formed of two parts, a mandrel provided with teeth on its outer surface, on which is positioned a sleeve formed of the various elements, doubled together, of a toothed belt, and a smooth deformable jacket. By means of this mold, the inner teeth of the belt are molded on the inner surface of the sleeve and a partial curing of the elastomeric material is carried out. The mold for the formation of the outer toothing of the belt is composed of two plates provided with teeth on their facing surfaces.

The teeth of the inner toothing of a portion of the partially cured sleeve are positioned in the teeth of one of the two plates, and the other toothed plate molds the outer surface on the opposite surface of that portion of the sleeve. The molding of the outer toothing of the belt is therefore effected in successive lengths.

By means of the flat plate mold, both the molding of the outer toothing of the double-toothed belt and the complete curing of the belts are carried out.

The above described known device for the formation of double-toothed belts of elastomeric material has the disadvantage that the time necessary for manufacturing the belts is considerably long and the cost of machinery and labor is high, with a consequent high cost of production of the double-toothed belts. In many cases the outer toothing of the belt is defective, due to the fact that its molding is carried out in successive lengths, so that the amount of production rejects is high. As the resistant insertion of the belt is constituted by cords parallel to one another, during the molding of the outer toothing, there is an irregular variation of the distance between the cords, and therefore an alteration of the resistant insertion. This alteration results in an average service life of the double-toothed belts which is too low.

Another known device for manufacturing double-toothed belts of elastomeric material is constituted by a mold and a milling machine. The mold consists of a mandrel provided with teeth on its outer surface, on which is formed a sleeve by doubling together the various elements constituting the belt, and of a deformable jacket. By means of this mold, it is possible to obtain a completely cured belt, provided with teeth on its inner surface and having a layer of elastomeric material on its outer surface.

The layer of elastomeric material present on the outer surface of the belt is processed with the milling machine, which cuts a toothing into it. This device for manufacturing double-toothed belts of elastomeric material has the disadvantage that, owing to the complicated processing for the formation of the outer toothing of the belt and owing to the high cost of the machinery, the belts produced with this type of device are very expensive. Moreover, on account of the deformability of the layer of elastomeric material in which the outer toothing is cut, the latter is often faulty because of inaccurate cut and irregular formation of some teeth. This results in belts having unsatisfactory performance and in a high amount of production rejects.

An object of the present invention is to provide a mold for the manufacture of double-toothed belts of elastomeric material which does not give rise to the above indicated disadvantages of the molds and devices of known type, and which is able to allow a low cost and high output production of double-toothed belts.

Another object of the invention is to provide double-toothed belts of elastomeric material which are devoid of defects on both toothings, namely both on the outer toothing and on the inner one, and which are covered with fabric on both toothings.

Other objects will become apparent from the following description with reference to the accompanying drawing wherein FIG. 1 illustrates in longitudinal section one embodiment of a mold for the manufacture of double-toothed belts according to the invention;

Figure 1:
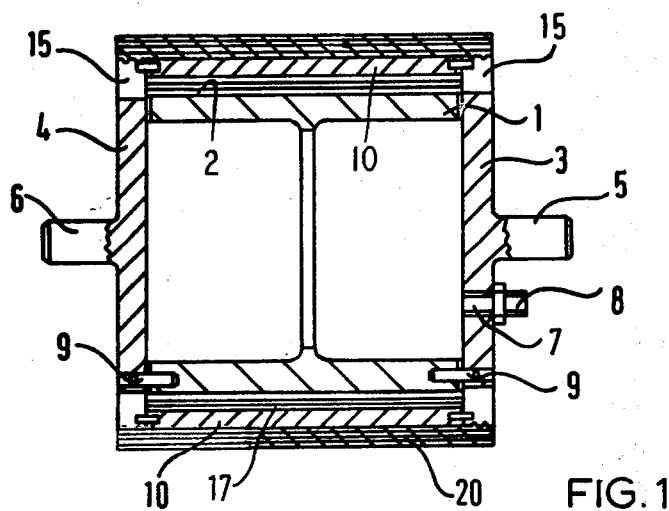

The foregoing objects and others are accomplished in accordance with the invention by providing a mold for the manufacture of double-toothed belts, characterized in that it comprises a mandrel provided with teeth on its outer surface, a plurality of shaped bars arranged around the toothed surface of the mandrel, said shaped bars having surfaces, directed towards the mandrel which have shapes adapted to form at least the groove of one tooth and of two half teeth, and means for carrying out a guided movement, in a direction radial to the mandrel, of the shaped bars.

The present invention will be better understood from the following detailed description made by way of non-limiting example with reference to the drawing.

As can be seen in FIG. 1, the mold according to the present invention, capable of manufacturing double-toothed belts of elastomeric material, has a hollow cylindrical mandrel 1 which is provided with teeth 2 on its outer surface.

The two bases of the mandrel 1 are closed by two bottoms 3 and 4 which, at their axis, coincident with the axis of the mandrel, carry in cantilever fashion shafts 5 and 6, respectively. Moreover, the bottom 3 is perforated and, at its hole 7, there is applied a fitting 8 for a tube intended to convey heating steam inside the mandrel.

The connection of the bottoms 3 and 4 to the mandrel 1 is carried out by means of threaded pins 9 or similar means, which permit an easy detachment of the bottoms from the mandrel.

The revolution surface of the mandrel carries a plurality of shaped bars 10 which, in their whole, have their surfaces, directed towards the revolution surface of the mandrel, shaped in the form of a toothing. Said shaped bars 10 are movable in a direction radial to the mandrel and are provided with means for carrying out said motion and for guiding it.

Figure 2:
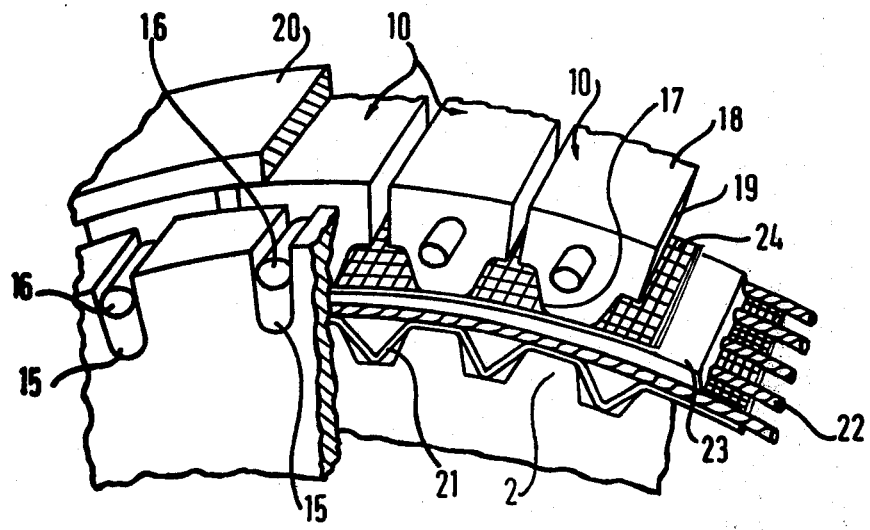
FIG. 2 shows in an enlarged scale a detail of the mold of FIG. 1 before the molding operation.

An example of the means which carry out the radial movement for approaching and/or detaching the shaped bars 10 and effect a guiding of the movement is represented in FIGS. 1 and 2 and is clearly illustrated in FIG. 2 in an enlarged scale, as a detail of FIG. 1.

The bottoms 3 and 4 extend in cantilever fashion with respect to the surface of the mandrel 1, where the toothing 2 is provided, forming flanges 11 and 12. Flanges 11 and 12 can constitute a single unit with the bottoms 3 and 4 or can be separate parts to be connected to the bottoms. In the latter case, in order to ensure a correct positioning of the flanges with respect to the mandrel, the bottoms 3 and 4 of the latter carry, integral with them, projecting pins 13, and the flanges comprise holes 14 for encasing said pins 13.

The flanges 11 and 12 are provided along their whole periphery with radial recesses 15 into which are encased pins 16 carried by the shaped bars 10.

The shaped bars 10 have their surface 17, directed towards the toothed mandrel, which is shaped in the form of a groove and of two half teeth of the outer toothing of the belt. The surface 18 of the bars 10 which is situated at the opposite side of the above indicated surface 17 is a portion of a cylindrical surface. The lateral surfaces 19 are plane surfaces which lie on planes passing through the axis of the mandrel.

A deformable jacket 20 is present on the assembly of the shaped bars 10 and surrounds said assembly.

The operation of the mold is as follows. A fabric 21 is applied at first on the mandrel 1 (see FIG. 2) provided with the toothing 2; the fabric is adapted approximately to the shape of the toothing 2 by means of elements not represented.

A cord 22 is wound up on the fabric 21 in several turns arranged side-by-side; the cord will constitute the tension resistant insertion of the finished belt.

A sheet of elastomeric material is applied in several superimposed layers on the turns of the cord 22 in order to form a layer 23 of elastomeric material having a thickness corresponding to the volume of elastomeric material required for the belt, toothings included.

A fabric 24 is applied on the layer 23.

At this moment the flanges 11 and 12 are applied to the bottoms 3 and 4 of the mandrel by inserting in the holes 14, obtained in the flanges, the pins 13 carried by the bottoms 3 and 4 of the mandrel.

Then the shaped bars 10 are applied by inserting the pins 16 of the latter in the radial recesses 15 of the flanges; the deformable jacket 20 is subsequently inserted on the unit.

In order to facilitate the assembly of the shaped bars 10 in the mold and to prevent the shaped bars from detaching, the pins 16 of adjacent pairs of shaped bars 10 can be connected together by means of a chain not represented.

Now the mold is introduced in an autoclave into which steam under pressure is admitted; steam is moreover sent inside the mandrel through the fitting 8.

Figure 3:
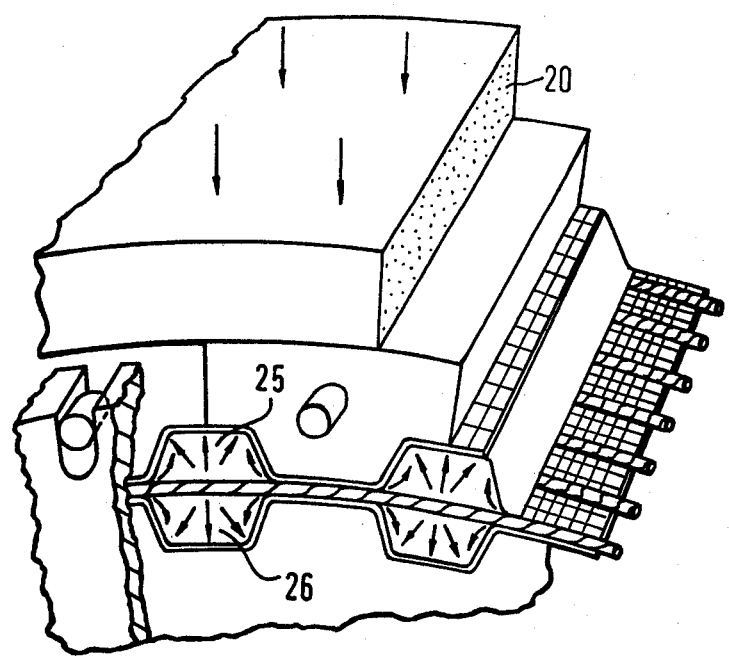
FIG. 3 shows in an enlarged scale a detail of the mold of FIG. 1 after molding.

Under the action of pressure, the shaped bars 10 approach the mandrel 1 until they come into contact with the turns of the cord 22, and compel the elastomeric material forming the layer 23 to fill all the spaces 25 and 26 (FIG. 3) which constitute the teeth of the double-toothed belt.

Moreover, in consequence of the action of heat, the elastomeric material is cured.

After curing, the removal of the toothed belt is carried out at first by moving away from the mold the deformable jacket 20; then the shaped bars 10 are removed and subsequently the flanges 11 and 12 are disconnected from the bases of the mandrel. At this moment the toothed belt is detached from the mandrel.

Figure 4:
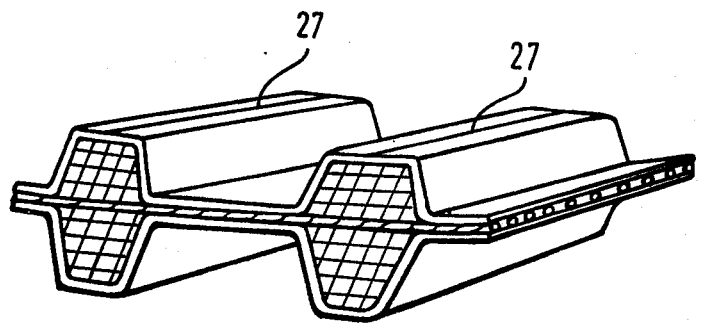
FIG. 4 shows a portion of a double-toothed belt of elastomeric material obtained with a mold provided by the present invention.

A portion of toothed belt obtained with the mold provided by the present invention is represented in FIG. 4. As can be seen in FIG. 4, the double-toothed belt of elastomeric material provided by the present invention has both of its toothings covered with a fabric, and the toothings are perfectly shaped because they are molded by means of rigid elements. In particular, also the outer toothing of the double-toothed belt is perfectly shaped by virtue of the particular type of mold provided by the invention, in particular as regards the working surfaces of the outer toothing which, as known, are those corresponding to the sides of the teeth and to the bottom of the grooves between the teeth.

In fact, the zones where possible flashes can be present, are those at the top of the teeth, in correspondence of their midline, represented in FIG. 4 with lines 27.

The fact that the proposed advantages are achieved by means of a mold according to the present invention can be easily understood from the following considerations.

Both of the toothings, namely the outer toothing and the inner one are molded by means of rigid elements and are therefore indeformable; this ensures an accurate shaping, at any molding pressure.

The elements which give rise to the formation of the outer toothing are guided in an exact manner during molding, and this ensures a uniform pitch of the outer toothing and a uniform and correct sizing of the outer toothing.

It is possible to have both toothings covered with a fabric since, as the part of the mold which comes into contact with the belt is made of rigid material, a pressure as high as desired can be exerted, and therefore the necessary pressure for molding can be applied.

Production rejects are avoided, because the mold, owing to its features, does not cause defects in the formation of the toothings.

The installation and service cost of the mold, and therefore the production cost of the double-toothed belt is low, being practically equal to that of belts provided with teeth only on their inner surface.

Although a particular embodiment of the mold according to the invention has been described and illustrated, it is to be understood that the invention includes possible modifications apparent to a technician of this art. For instance, it includes the modification in which the surface of the shaped bars directed towards the mandrel has the shape of two grooves, one tooth and two half teeth of the outer toothing of the double-toothed belt and also, as limit case, the modification in which the surface of the shaped bars directed towards the mandrel and/or the surface of the mandrel are indented, namely are constituted by a series of projections and grooves which give rise to a driving belt provided with indentations on one face and with teeth on the other, or with indentations on both faces. Consequently, the present invention includes also the particular case of a driving belt, as for instance a V-belt provided with indentations, namely with recesses on one base (the larger or the smaller) or on both bases, the bases, however, being always covered with a fabric.

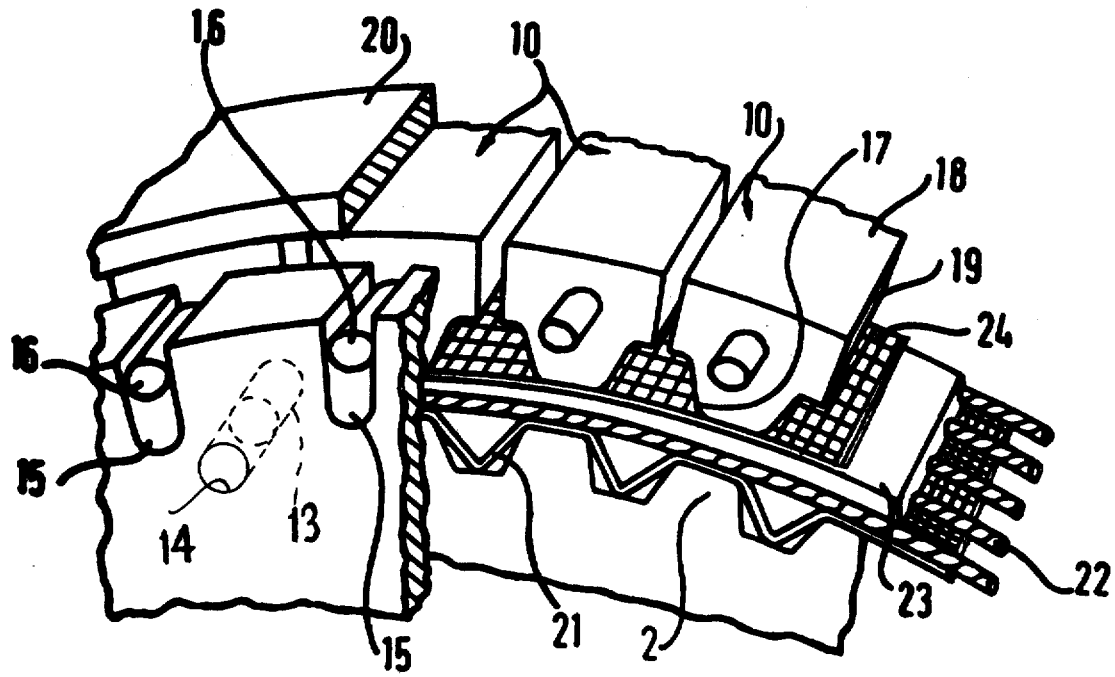

I claim:

1. A mold for the manufacture of double-toothed belts comprising a mandrel provided with teeth on its outer surface, a plurality of shaped bars arranged around the toothed surface of the mandrel, said shaped bars having their surface directed towards the mandrel, each bar being shaped to form at least the groove of one tooth and two half teeth, and means for carrying out a guided movement, in a direction radial to the mandrel, of said shaped bars.

2. The mold of claim 1 comprising a pair of flanges removably connected at the bases of the toothed mandrel, and wherein the means for carrying out a guided movement, in a direction radial to the mandrel, of the shaped bars, consist of radial recesses on the edges of the flanges, pins integral with the shaped bars, which are encased and movable in said radial recesses, and a deformable jacket surrounding the assembly of the shaped bars.

3. The mold of claim 2 comprising chains for connecting together the pins belonging to adjacent shaped bars.

4. A mold for shaping an elastomeric belt having teeth on opposite sides thereof which comprises a hollow cylindrical mandrel having alternate grooves and ridges extending longitudinally across its curved surface, said grooves corresponding in shape to a tooth to be molded on the belt and said ridges corresponding to the shape of a groove to be disposed between teeth, a circular plate secured to each end of the mandrel and having an annular flange extending radially exterior of the curved surface of the mandrel, open circumferentially spaced radially extending slots in said annular flanges, a series of bars disposed across said curved surface circumferentially disposed about the periphery of the mandrel in radially spaced relationship therewith, pins on the ends of the bars disposed in said slots for supporting the bars in said spaced relationship, that surface of each bar facing the mandrel having a surface configuration which corresponds to the shape of one groove between teeth to be formed on one belt surface and substantially one-half of a tooth on each side of the groove, said bars being disposed whereby a one-half tooth portion of one bar combines with one of an adjacent bar to form a whole tooth, means for heating the mandrel and means for pressing the bars towards the mandrel, said bars being arranged about the mandrel surface whereby teeth on one side of the belt will be directly opposite teeth on the opposite side of the belt.

* * * * *

UNITED STATES PATENT OFFICE
CERTIFICATE OF CORRECTION

Patent No. 3,934,968   Dated January 27, 1976

Inventor(s) Mario Cicognani

It is certified that error appears in the above-identified patent and that said Letters Patent are hereby corrected as shown below:

The cover sheet should be cancelled to read as per attachment.
Figure 2 should be cancelled to read as follows:

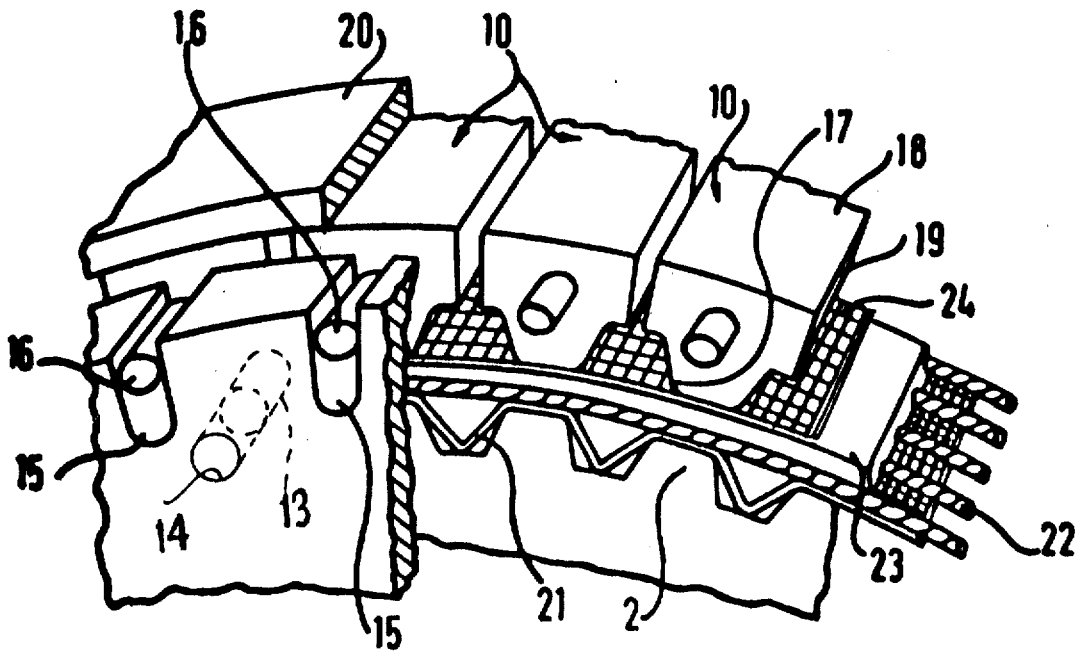

Signed and Sealed this

Twenty-third Day of November 1976

[SEAL]

Attest:

RUTH C. MASON
Attesting Officer

C. MARSHALL DANN
Commissioner of Patents and Trademarks

United States Patent
Cicognani

[11] 3,934,968
[45] Jan. 27, 1976

[54] MOLD FOR MAKING DOUBLE-TOOTHED BELTS

[75] Inventor: Mario Cicognani, Milan, Italy
[73] Assignee: Industrie Pirelli S.p.A., Milan, Italy
[22] Filed: Mar. 4, 1975
[21] Appl. No.: 555,254

[30] Foreign Application Priority Data
Apr. 26, 1974 Italy ............... 21925/74

[52] U.S. Cl. .............. 425/28 B; 425/40; 249/83; 425/129 R
[51] Int. Cl.² .............. B29D 29/00; B29H 7/22
[58] Field of Search ......... 425/28 B, 29, 30, 34 B, 425/35, 39, 40, 43, 129 R; 249/83

[56] References Cited
UNITED STATES PATENTS

| | | |
|---|---|---|
| 3,114,598 | 12/1963 | Beckadolph et al. ............. 249/83 X |
| 3,656,360 | 4/1972 | Fix ........................... 425/28 B X |
| 3,784,338 | 1/1974 | Previati ...................... 425/28 B |
| 3,813,197 | 5/1974 | Ray et al. .................... 249/83 X |

FOREIGN PATENTS OR APPLICATIONS

| | | | |
|---|---|---|---|
| 6,615,598 | 9/1967 | Netherlands ........... | 425/28 B |

Primary Examiner—J. Howard Flint, Jr.
Attorney, Agent, or Firm—Stevens, Davis, Miller & Mosher

[57] ABSTRACT

A mold for shaping a belt having teeth on opposite sides thereof has a hollow cylindrical mandrel with a surface configuration corresponding to alternate grooves and teeth to be formed on one side of the belt and a plurality of bars arranged side by side around the mandrel having surfaces facing the mandrel corresponding to the configuration of teeth and grooves to be formed on the opposite side of the belt. The bars are supported in radially spaced relation with the mandrel surface in slots in the peripheral surface of end members for the cylinder and are adapted to move under pressure radially inwardly.

4 Claims, 4 Drawing Figures